United States Patent
Jayasoma et al.

(10) Patent No.: US 10,530,200 B2
(45) Date of Patent: Jan. 7, 2020

(54) ELECTRIC DEVICE STATOR AND METHODS FOR WINDING

(75) Inventors: Sujitha Jayasoma, Andover (GB);
Andrew Parsons, Salisbury (GB)

(73) Assignee: CONTROL TECHNIQUES DYNAMICS LIMITED, Andover Hampshire (GB)

( * ) Notice: Subject to any disclaimer, the term of this patent is extended or adjusted under 35 U.S.C. 154(b) by 1740 days.

(21) Appl. No.: 13/384,841

(22) PCT Filed: Jul. 20, 2010

(86) PCT No.: PCT/IB2010/053295
§ 371 (c)(1),
(2), (4) Date: Sep. 21, 2012

(87) PCT Pub. No.: WO2011/010281
PCT Pub. Date: Jan. 27, 2011

(65) Prior Publication Data
US 2013/0033132 A1 Feb. 7, 2013

(30) Foreign Application Priority Data

Jul. 22, 2009 (GB) .................................. 0912759.8
Feb. 16, 2010 (GB) .................................. 1002436.2

(51) Int. Cl.
*H02K 1/14* (2006.01)
*H02K 3/34* (2006.01)
*H02K 3/52* (2006.01)
*H02K 15/02* (2006.01)

(52) U.S. Cl.
CPC ............... *H02K 1/148* (2013.01); *H02K 3/34* (2013.01); *H02K 3/522* (2013.01); *H02K 15/022* (2013.01); *Y10T 29/49009* (2015.01); *Y10T 29/53143* (2015.01)

(58) Field of Classification Search
CPC ........... H02K 3/34; H02K 3/345; H02K 1/148
USPC ........... 310/216.051, 216.086, 214, 215, 194
See application file for complete search history.

(56) References Cited

U.S. PATENT DOCUMENTS

| 3,821,846 | A | * | 7/1974 | Pleiss, Jr. | ............. H02K 15/024 29/596 |
| 6,532,645 | B1 | | 3/2003 | Becherucci et al. | |
| 7,111,380 | B2 | * | 9/2006 | Sheeran et al. | ................. 29/596 |
| 7,116,023 | B2 | * | 10/2006 | Wang et al. | .................... 310/71 |
| 2005/0051661 | A1 | | 3/2005 | Faulhammer et al. | |
| 2006/0261699 | A1 | * | 11/2006 | Nishimura | .................... 310/218 |
| 2008/0129142 | A1 | | 6/2008 | Sheeran et al. | |

(Continued)

FOREIGN PATENT DOCUMENTS

CN 101164218 A 4/2008
EP 1 202 438 A2 5/2002

(Continued)

OTHER PUBLICATIONS

USPTO Translation, Noguchi, JP 53133702 A, Nov. 21, 1978.*

(Continued)

*Primary Examiner* — Thomas Truong
(74) *Attorney, Agent, or Firm* — Jones Robb, PLLC

(57) ABSTRACT

An end cap mounted on the stator element is provided with the same cut-out as arranged on the stator segment so that both parts can be secured on a retainer system for winding processing. The end cap are arranged to retain insulating materials.

14 Claims, 7 Drawing Sheets

(56) References Cited

U.S. PATENT DOCUMENTS

2008/0315710 A1* 12/2008 Morioka et al. ............. 310/217
2009/0134742 A1   5/2009 Rhode
2009/0140599 A1   6/2009 Yoshiyama

FOREIGN PATENT DOCUMENTS

| FR | 2 109 301 | 5/1972 | |
|----|-----------|--------|---|
| JP | 53133702 A * | 11/1978 | ............. H02K 3/52 |
| JP | 55 103061 | 8/1980 | |
| JP | 2002 233091 A1 | 8/2002 | |
| JP | 2006 180674 A | 7/2006 | |
| WO | WO 2005/096469 A2 | 10/2005 | |

OTHER PUBLICATIONS

International Search Report and Written Opinion for International Application No. PCT/IB2010/053295 dated Jan. 27, 2011.
Office Action dated Apr. 4, 2012, issued by the Great Britain Patent Office, for co-pending GB Application No. GB 1002436.2, filed Feb. 16, 2010.
English language machine translation of JP 2006 180674 A.
Office Action from corresponding Chinese Application No. 201080033144.7, dated May 12, 2014.
English Language translation of Office Action from corresponding Chinese Application No. 201080033144.7, dated May 12, 2014.
Communication Pursuant to Article 94(3) EPC in EP Application No. 10 742 285.9, dated Apr. 10, 2019.

\* cited by examiner

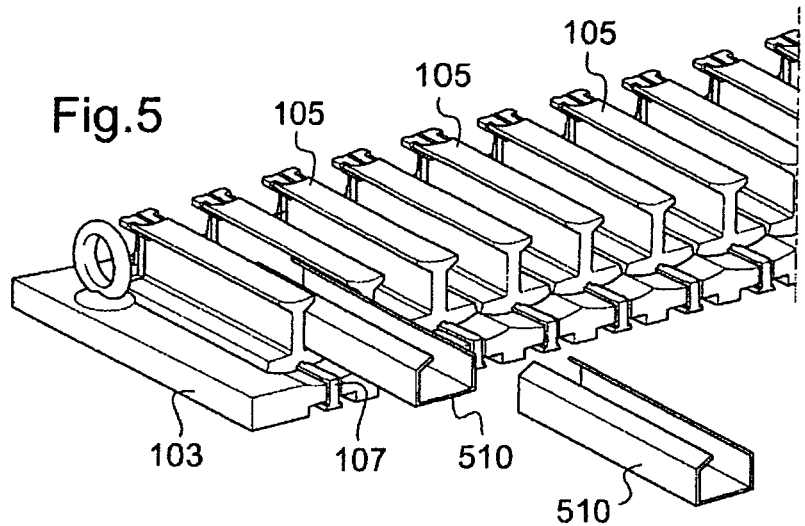
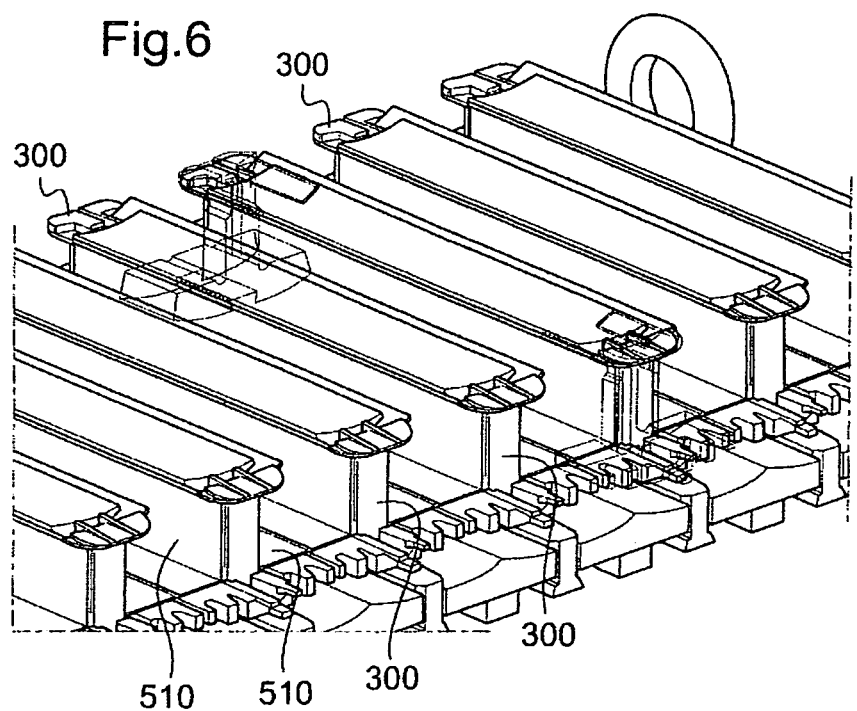

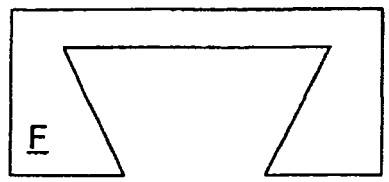
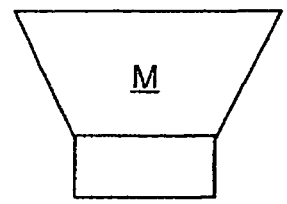
Fig.7A
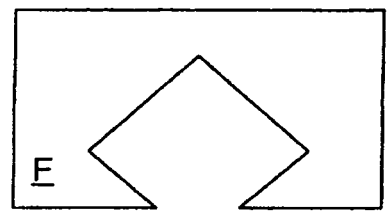
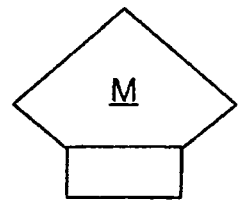
Fig.7B
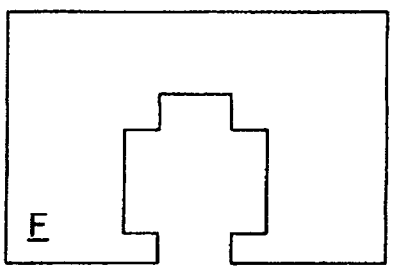
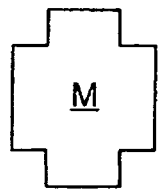
Fig.7C
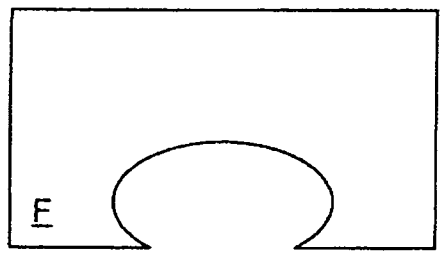
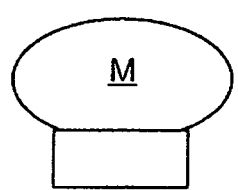
Fig.7D

ELECTRIC DEVICE STATOR AND METHODS FOR WINDING

This is a national stage application under 35 U.S.C. § 371(c) of PCT/162010/053295, filed internationally on Jul. 20, 2010, which claims priority to British Application No. 0912759.8, filed in Great Britain on Jul. 22, 2009, and British Application No. 1002436.2, filed in Great Britain on Feb. 16, 2010, the entire contents of each of which are incorporated by reference herein.

The present disclosure relates to electric machines. The disclosure relates more particularly to stators of an electric machine comprising stator teeth and systems and methods for assembling stator teeth to be wound.

Stators comprising a plurality of stator teeth for electric machines have typically been configured for external or internal rotors, and have been prepared for installation of an electric circuit (e.g., windings) using various methods. For example, in some systems, a plurality of laminates, punched or otherwise fabricated (e.g., laser cut) from a desired material (e.g., iron), may have a circular shape with a continuous 360 degree back iron, and include all stator teeth. These laminates are assembled together (e.g., layered) such that a completed 360 degree stator core results following such assembly. However, applying the electrical circuit to the teeth of a stator that has been assembled in such a way can be particularly difficult, especially where the stator is configured for internal rotor operation and/or is relatively small in size.

Another method for preparation of a stator involves segmenting the stator teeth into multiple stator segments having a back iron section and one or more teeth thereon. Each of these stator segments is formed from a plurality of laminates, each having a back iron and one or more teeth. The laminates may be assembled together (e.g., layered), resulting in a stator segment. The stator segments may then be joined (e.g., via their back irons) to form a complete stator core (i.e., 360 degrees around). However, such an assembly method can be difficult, because the individual laminates may not be easily stabilized and/or managed due to shape and/or size, among others.

An electrical circuit associated with the stator is typically prepared from a series of windings of wire (e.g. loops of copper wire) or other suitable material, for example, in a concentrated winding or distributed winding configuration. Where a segmented approach has been implemented, these windings may be applied prior to assembly of the individual stator segments into a complete stator. For example, each package of laminates forming a stator segment may be held in winding jig or other suitable apparatus while the windings are applied by any desired method.

It has been desirable to insulate these windings from the stator teeth and therefore, insulation is typically inserted in notches between each stator segment prior to winding. Such insulation may include sheets of paper or other suitable insulating material, which can be loose fitted into the sectors. Upon winding of the stator segment with wire, the insulation is held in place by the loops of wire forming the windings.

In addition to the insulation inserted within the sectors of each tooth, insulating members have typically also been provided at end portions of each package of laminates prior to winding for purposes of insulating the end portions associated with the stator teeth. Such end insulators may include plastic "caps" or other materials, and have been, similar to the insulating material, held in place by the windings.

Numerous issues exist with respect to current processes for manufacturing stator teeth. For example, because the completed stator is typically round in shape, the back irons of each tooth may possess a rounded bottom face, representing an arc of the circle to be formed by a surface of the completed stator. Such rounded edges may result in difficulties affixing a plurality of laminates to a single winding jig and a lack of stability during winding, among other things. In addition, because the plurality of laminates forming the teeth are sometimes not affixed to one another prior to winding, securing the plurality of laminates in a winding jig may be cumbersome and difficult to accomplish without occurrence of misalignment or loosening between laminates. This may be particularly prevalent when performing a winding process in which relatively large forces are applied (e.g., open slot needle winding process), resulting in relatively high wire tension.

Further issues may exist with regard to the insulating elements, both within the sectors of the teeth and the ends of the laminate packages. For example, because these insulating elements are typically loose fit into their respective positions prior to winding, it is possible that misalignment and/or complete separation may occur. Loss of such insulating components during the winding process may result in increased costs based on time and materials lost during the manufacturing process.

Some references describe stator laminates having notches and/or hollows made as a result of the cutting or punching process for the laminates. For example, French Patent FR 2 109 301 describes a method for manufacturing a plurality of laminates stamped from a sheet of metal to result in chains of teeth for formation into a stator. Cut outs present on a back iron having at least two stator teeth are a result of the cutting process for the laminate and are configured to enable placement of spacing members around a periphery of the stator. Likewise, Japanese Patent Application JP 55 103061 describes hollows present on a single back iron having three stator teeth, for maximizing yield of a particular sheet of metal. However, neither of these references address the winding problems discussed above.

U.S. Pat. No. 6,532,645 describes methods and apparatus for wire winding and fabrication for electric machines using a plurality of holding members. However, these methods and apparatus do not address the desire to utilize a single winding jig with a plurality of packages mounted thereto in a simple and efficient configuration, nor do they address issues associated with retaining the insulating elements.

U.S. Patent Publication 2005/0051661 describes an apparatus for winding stator teeth. However, the teeth are held spaced apart in a movable winding jig. Such a configuration provides little if any assistance with the cumbersome task of assembling a plurality of loose laminates for winding or the problems associated with the insulating materials described above.

Accordingly, there exists a need for systems and methods for winding stator teeth that results in relatively easy assembly of laminations and a firm holding of the laminations, while also providing systems for holding desired insulations in place during the winding process.

According to some aspects, the present disclosure is directed to a stator segment. The stator segment may include only one tooth section and a back iron section, the back iron section having a retainer interface presenting a dovetail shape.

Stator teeth configured in such an arrangement may ease the task of assembling stator segment laminates and further provide secure retention of such laminates during winding, leading to less waste during manufacture due to such things as improper alignment during assembly, misalignment of laminates during winding, and bending of laminates, among other things.

In some embodiments, the stator segment further comprises a plurality of stator laminates comprising a magnetic material.

In some embodiments, the retainer interface is located at a peripheral surface of the back iron and may comprise a channel open to three surfaces of the back iron section.

In some embodiments, an axis of symmetry associated with the retainer interface is substantially co-linear with an axis of symmetry associated with the tooth section.

In some embodiments, an end cap may also be provided, the end cap comprising an end cap dovetail interface, the end cap interface being at least partially dovetailed in shape and configured to substantially coincide with a periphery of the retainer interface.

In some embodiments, the stator segment may comprise an aperture on a face of the stator segment forming an end cap aperture interface and a stator segment engaging portion associated with the end cap and configured for engaging the end cap aperture interface.

An axis of symmetry associated with the end cap aperture interface or the end cap dovetail interface may be substantially co-linear with an axis of symmetry associated with the stator segment.

The end cap may include an electrically non-conductive material, such as an injection molded plastic material. The end cap may further include an insulator engaging segment, which may include one or more protrusions configured to exert a force on one or more insulating materials.

According to another aspect, the present disclosure is related to a stator core comprising a plurality of the stator segments described above and assembled together.

According to yet another aspect, the present disclosure is related to a method for winding a stator segment. The method includes retaining one or more stator segments via their retainer interfaces, and winding one or more coils of wire around the tooth section of each of the one or more stator segments.

According to yet another aspect, the present disclosure is directed a stator segment and retainer system. The stator segment and retainer system may include a retainer having a dovetail shape and a stator segment formed from a plurality of stator laminates. The stator segment may include a tooth section and a back iron section, the back iron section having a retainer interface. The retainer interface has a dovetail shape and is configured to receive the retainer, the retainer being configured to interface with a winding jig and the retainer interface such that the plurality of stator laminates remains in a substantially fixed position on the winding jig during a winding process.

Such a system may aid operators and or machines tasked with assembling stator laminates and winding stator teeth based on the ability to easily assemble laminates on a winding jig and subsequently transport the winding jig comprising any number of assembled stator teeth to a winding machine or, for example, test bench. Such a system may further reduce improper alignment during assembly, misalignment of laminates during winding, and bending of laminates, among other things.

In some embodiments, the retainer is affixed to the winding jig, and may be monolithically formed with the winding jig.

In some embodiments, interaction between the retainer interface and the retainer results in an interference fit between at least one of the plurality of stator laminates and the winding jig.

In some embodiments, the retainer interface is a cut-out dovetail shape.

In yet another aspect, the present disclosure is directed to an end cap for a stator segment. The end cap may include an end cap dovetail interface being dovetail in shape and/or a stator segment engaging portion and an insulator engaging segment configured to engage one or more insulating materials.

End caps configured according to the present disclosure may provide added stability with regard to assembled and wound stator segments based on the forces applied by the windings through the end caps. Further, because such end caps are configured to remain firmly in place during winding operations, chances of misalignment are substantially reduced.

In addition, such configurations enable the continued use of insulating elements loose fit into respective notches between stator teeth prior to winding, thanks to the insulation engaging segment provided. Such a segment being configured to hold insulating materials in place, thus reducing occurrence of costly misalignments and/or separations. Thus, stator manufacturing costs may be reduced based on, for example, reduced waste.

The end cap may comprise injection molded plastic material, and the insulator engaging segment may include a tab extending away from a face of the end cap, the face being configured to interface with an end portion of a stator segment.

FIG. 5 shows an exemplary configuration for placement of insulating material, according to embodiments of the present disclosure;

FIG. 6 is an exemplary illustration of end cap installation, following placement of insulating material, according to embodiments of the present disclosure;

FIG. 7A is an illustration of exemplary shapes of male and female portions of a "dovetail" joint consistent with the present disclosure;

FIG. 7B is an illustration of another set of exemplary shapes of male and female portions of a "dovetail" joint consistent with the present disclosure;

FIG. 7C is an illustration of another set of exemplary shapes of male and female portions of a "dovetail" joint consistent with the present disclosure; and FIG. 7D is an illustration of another set of exemplary shapes of male and female portions of a "dovetail" joint consistent with the present disclosure.

Various stator embodiments may be implemented for utilization in electric machines, for example, electric motors, generators, or other electric devices, and are used in conjunction with a rotor among other components for purposes of performing various operations (e.g., performing work, generating electrical current, etc.) Such stators therefore, may include stator segments (e.g., comprised of a plurality of laminates) having a back iron and a tooth section, windings, and insulating elements, among other things.

Figure 1A:
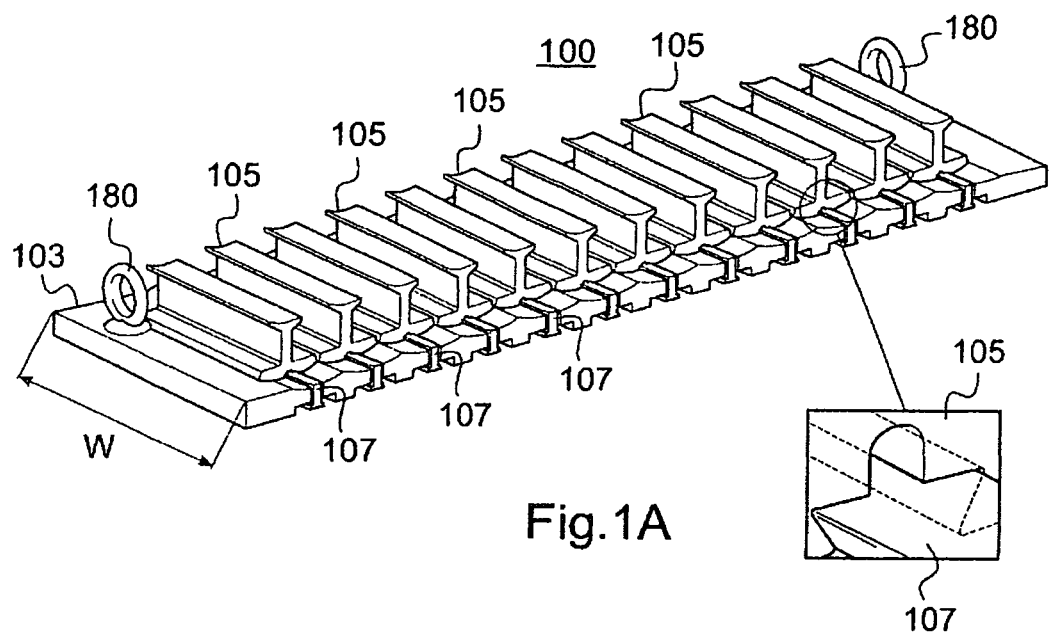
FIG. 1A is an illustration of an exemplary winding jig with a plurality of stator segments mounted thereon, consistent with embodiments of the present disclosure.

FIG. 1A is an illustration of an exemplary winding jig 100 with a plurality of stator segments 105 (formed from stator segment laminates 110) mounted thereon, in preparation of winding, FIG. 1 being consistent with embodiments of the present disclosure. Winding jig 100 may include, for example, a mount plate 103, stator segment retainers 107, as well as various jig fixtures 180, among others. The general configuration of winding jig 100 is intended as exemplary only, and one of skill in the art will recognize that various embodiments of winding jig 100 could be implemented in accordance with the present disclosure.

Mount plate 103 is configured to receive one or more stator segment retainers 107 such that stator segments 105 are retained on mount plate 103, and therefore winding jig 100. Mount plate 103 may be fabricated from any suitable material (e.g., metal, plastic, etc.) and of any suitable size (e.g., having a width W) based on, for example, a number of stator teeth to be wound and a size of such stator teeth.

Mount plate 103 may include numerous features 180 enabling transport of winding jig 100 and/or attachment of winding jig 100 to a winding machine. Features 180 may include various fasteners, connection points, etc. as desired for a particular winding application. One of skill in the art will recognize that the nature and position of features 180 may vary according to, for example, transport method, application, and/or winding machine, among other considerations. Thus, any such configuration is intended to fall within the scope of the present disclosure.

Figure 1B:
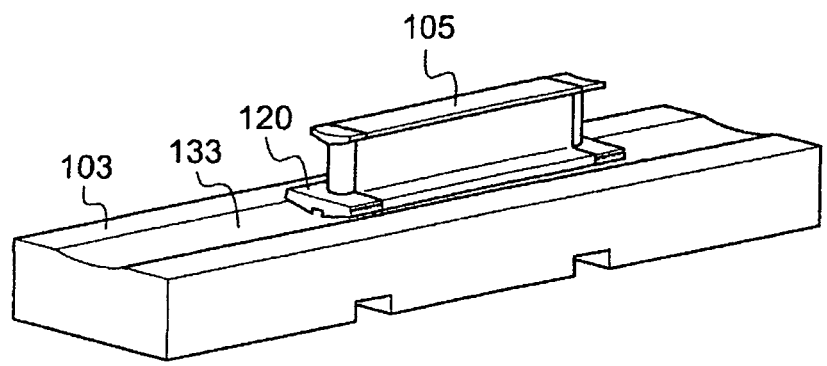
FIG. 1B is an illustration of a portion of another exemplary winding jig, showing one of a plurality of stator segments mounted thereon, and consistent with embodiments of the present disclosure.
Figure 1C:
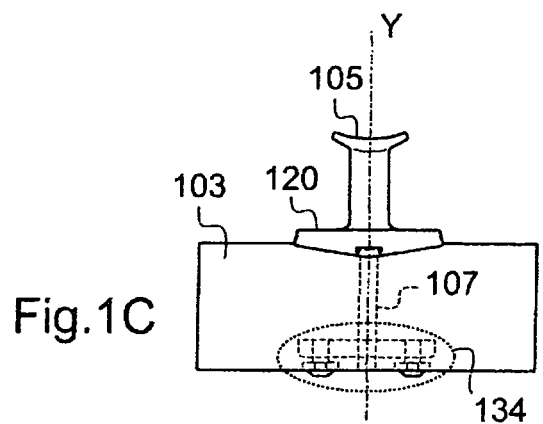
FIG. 1C is a cross-section illustration of the portion shown in FIG. 1B.

One of skill in the art will recognize that mount plate 103 may further include additional features to facilitate assembly of stator segments 105 using stator segment laminates 110 (e.g., contoured surfaces). For example, as shown in FIGS. 1B and 1C, a contoured concave surface is provided on a face of mount plate 103 to facilitate receiving a convex rounded surface of a back iron 120 of a stator segment 105. Such a contour may be of any desirable size and shape to facilitate receipt of various sizes and shape of back iron 120 associated with a stator segment 105. For example, such a contour may be convex and configured to receive a concave surface of a back iron 120.

Stator segment retainers 107 are configured to interface (e.g., receive and retain) a plurality of stator segment laminates 110 (shown in FIGS. 2A and 2B) and to substantially hold stator segment laminates 110 in place on winding jig 100 during a winding process (e.g., open slot needle winding, bobbin winding, etc.). For example, stator segment retainers 107 may comprise one or more lengths of material suitable for interfacing with and retaining laminates (e.g., steel, aluminium, plastics, etc.), the length of material having a substantially "dovetail" shape and may include, for example, tapered sections 133 designed to facilitate receipt of one or more laminates 110. One of skill in the art will recognize that the term "dovetail" as used herein, is derived generally from a class of joints, wherein the joints are formed via complementary male and female portions each having a substantially complementary shape (e.g., trapezoidal, diamond, oval, etc.) configured to cooperate with its counterpart to provide forces and/or counter forces that result in at least partial affixing of the two parts. In other words, as a result of joining the male and female portions, forces may result such that the male and female portions may remain joined. The male portion comprises a material while the female portion comprises a void of material (i.e., a groove or notch) each having a shape complementing the other. FIGS. 7A-7D are illustrations of exemplary shapes of male (M) and female (F) portions of a "dovetail" joint for purposes of the present disclosure. One of ordinary skill in the art will recognize that any shape combination comprising male and female portions of complementary shapes resulting in cooperation causing at least partial affixing between two parts is intended to fall within the scope of the present disclosure.

One or more stator segment retainers 107 may extend along width W of mount plate 103 and are affixed to mount plate 103 in any suitable fashion resulting in substantial immobility for stator segment retainers 107. For example, stator segment retainers 107 may include one or more fasteners (e.g., reusable screws), clips (e.g., integrally fabricated with stator segment retainer 107), and/or other gripping members configured to engage mount plate 103. In some embodiments, stator segment retainers 107 may be operably engaged within mount plate 103 to allow movement of stator segment retainers 107 along an axis Y, which may correspond with axis of substantial symmetry S (discussed below). FIG. 1C shows a cross section of a portion winding jig 100 including stator segment retainers 107 operably engaged with mount plate 103. In such embodiments, stator segment retainers 107 may extend through mount plate 103 along axis Y such that a dovetail portion is presented on a first face of mount plate 103, with a force receiver portion 134 located near a second face (e.g., bottom) of mount plate 103. This may allow the fixing portion 134 to engage with a force generating apparatus (e.g., machinery, tensioning bolts, etc.) to exert a force (e.g., slidable pulling) on laminates 110 when mounted on stator segment retainers 107. For example, force receiver portion 134 may engage a machine (not shown) capable of causing a suitable force (e.g., a pulling) to be exerted on force receiver portion 134, which may, in turn, result in a force being applied through stator segment retainer 107 on stator segment 105 and its associated laminates 110 that have been mounted on stator segment retainer 107 (e.g., via the dovetail of back iron 120). Any suitable machine may be used, for example, pneumatic, hydraulic, mechanical (e.g., screw tensioner), etc.

In some embodiments, stator segment retainers 107 may also be affixed by heat (e.g., spot welded) and/or clipped to mount plate 103. Alternatively, in some embodiments, stator segment retainers 107 may be integrally (e.g., monolithically) fabricated with mount plate 103, for example, by a machining process configured to remove material from mount plate 103 resulting in formation of dovetail shaped stator segment retainers 107 on a surface of mount plate 103. Various methods may be used for fabricating stator segment retainers 107 in conjunction with mount plate 103 (e.g., a molding process), all of which are intended to fall within the scope of the present disclosure.

Stator segment retainers 107 are spaced along a length of mount plate 103 according to various considerations such as laminate construction (e.g., continuous or individual), the number of laminates associated with a stator, winding method (e.g., open slot needle winding), winding type (e.g., concentrated or distributed winding), stator and/or tooth size (e.g., radius of curvature), and winding machine characteristics, among other things. In some embodiments, such spacing may be adjustable, for example, where clips or other reusable fasteners are used for affixing stator segment retainers 107 to mount plate 103. In such embodiments, based on various factors, a user may position stator segment retainers 107 at any desired position along the length of mount plate 103 for affixing. Additionally, this may allow multiple sets of stator segments associated with one or more stators to be affixed to mount plate 103 and wound simultaneously, thereby resulting in potential cost savings.

Figure 2A:
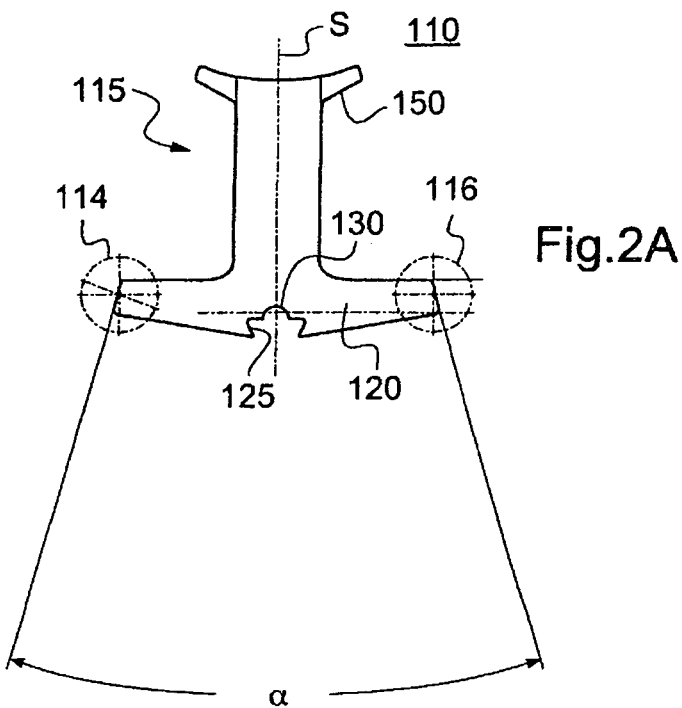
FIG. 2A is an illustration of an exemplary stator segment laminate, consistent with embodiments of the present disclosure.

FIGS. 2A and 28 illustrate exemplary stator segment laminates 110, a plurality of which are assembled for purposes of forming a complete stator segment 105 (e.g., assembly via mounting on stator segment retainers 107). Stator segment laminates 110 include a distal end also known as a tooth 115, a back iron 120 from which tooth 115 extends, and, in some embodiments, interconnecting segments 114 and 116, among others. In some embodiments, such as those shown in FIGS. 2A and 28, tooth 115 may include pole shoes 150, configured to support one or more windings associated with stator segment 105, among other things. It is important to note that pole shoes 150 may or may not be implemented as desired, and are intended as exemplary only.

Stator segment laminates 110 are fabricated from any suitable material (e.g., magnetic materials such as steel, iron, etc.) and may be stamped, machined, and/or otherwise manufactured in any desired size and shape. Sizing, design, and fabrication of stator segment laminates 110 may take into consideration various factors such as strength, weight, magnetic flux, eddy current generation, cooling, and motor size, among other things.

Figure 2B:
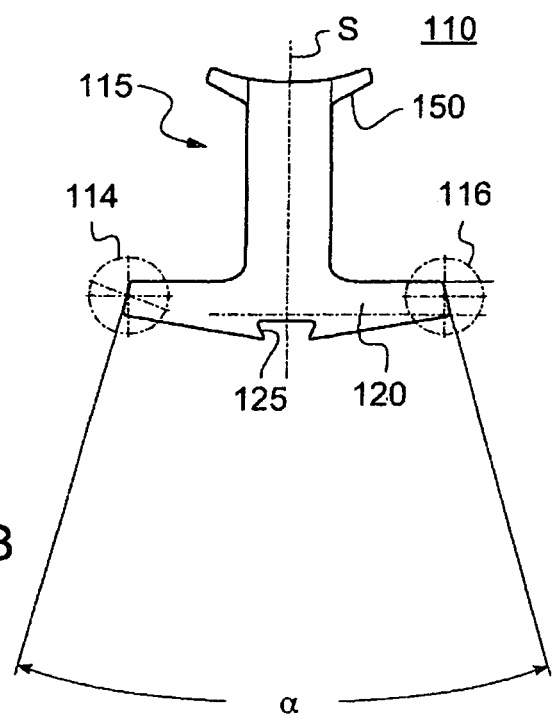
FIG. 2B is an illustration of another exemplary stator segment laminate, consistent with embodiments of the present disclosure.

In some embodiments, a shape associated with stator segment laminates 110 may be determined based on a motor configuration. For example, where a stator is configured to be implemented with an external rotor, back iron 120 may have a substantially convex shape relative to tooth 115. In another example, where a stator is configured for implementation with an internal rotor, back iron 120 may have a substantially concave shape relative to tooth 115, as shown in FIGS. 2A and 2B. A radius of curvature associated with back iron 120 may further be based on design considerations such as rotor size, number of stator teeth, and desired power, among other things.

Figure 2C:
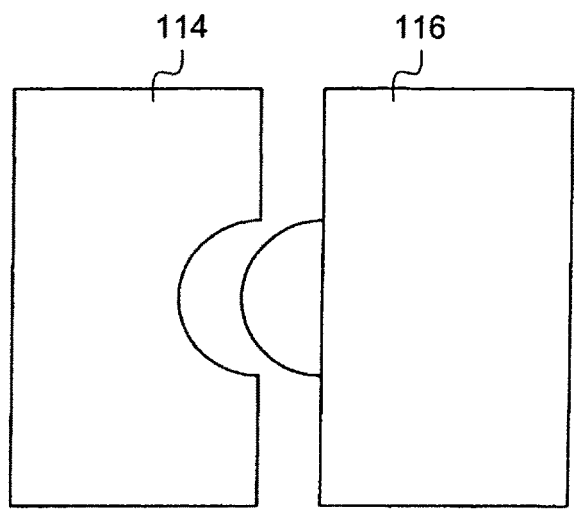
FIG. 2C is an illustration of one set of shapes associated with interconnecting segments between stator teeth, consistent with embodiments of the present disclosure.
Figure 2D:
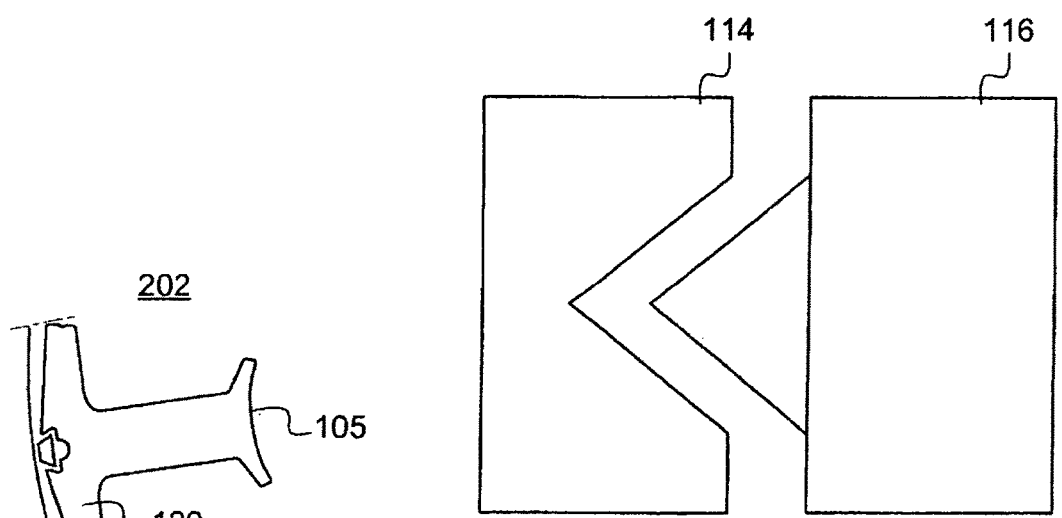
FIG. 2D is an illustration of another set of shapes associated with interconnecting segments between stator teeth, consistent with embodiments of the present disclosure.

In embodiments including interconnecting segments 114 and 116, joining of each back iron 120 of a stator segment 105 to another can be facilitated. In such embodiments, a first interconnecting segment 114 may possess a groove, channel, or punch-out configured to interface with a protrusion present on second interconnecting segment 116. For example, shapes associated with interconnecting segments 114 and 116 may include shapes shown in FIGS. 2C and 2D (e.g., semicircles and angular shapes). In addition, shapes may include those described with regard to the "dovetail" described herein. Thus, upon joining of two or more stator segments 105, first interconnecting segment 114 engages second interconnecting segment 116 to facilitate alignment and assembly of the stator, among others. Such an arrangement may be present both with individual stator segment laminates, and laminates manufactured as a pre-connected strand of laminates.

Side faces of back iron 120, and/or faces of interconnecting segments 114 and 116 (when present), maintain a predetermined angle $\alpha$ between their faces such that upon assembly, a stator of a desired diameter is formed. Such an angle may be based on the number of stator segments 105 to be included with the stator (e.g., where 12 stator teeth are to be included, a equals 30 degrees).

Each stator segment laminate 110 may have an axis of substantial symmetry S, about which each stator segment laminate 110, and therefore, tooth 115, is substantially symmetric. In some embodiments, some deviation from symmetry may occur, for example, to allow for alternating positioning of interconnecting segments 114 and 116 associated with stator segment laminates 110, facilitating interconnectivity of stator teeth, among other things. One of skill in the art will understand that substantial symmetry should be considered as existing about axis S, in view of such a configuration.

In some embodiments, stator segment laminates 110 may include individual laminations and/or modular laminations machined as a continuous "strand" interconnected by pieces of material (e.g., hinged) using various manufacturing techniques.

To enable stator segment laminates 110 to be aligned and assembled along a stator segment retainer 107, back iron 120 of stator segment laminate 110 includes a dovetail retainer interface 125, among other things. For example, during a fabrication process for stator segment laminates 110, or separately therefrom, material can be removed (e.g., cut out) from back iron 120 such that a dovetail void (i.e., female portion) is formed in back iron 120. In some embodiments, such retainer interfaces 125 comprise a channel or hole open to three surfaces of the back iron section (e.g., a front face, a back face, and a bottom or periphery).

Retainer interface 125 may be configured such that when mounted on a stator segment retainer 107, an interference fit may result, thereby enabling additional retentive forces on stator segment laminate 110. For example, clearances between winding jig 100 and a bottom face of stator segment laminate 110 at a location near retainer interface 125 may be negative upon installation of stator segment laminate 110 on stator segment retainer 107, thus resulting in compressive forces applied between the two parts, and thus additional retention. Additionally, as described above, such forces may be enhanced where stator segment retainers 107 are operably engaged within mount plate 103 and configured to engage a force providing machine.

While the present disclosure focuses primarily on embodiments wherein back iron 120 includes female portion F of a dovetail, in some embodiments, it may be desirable to implement an inversion, wherein back iron 120 includes male portion M of the dovetail. In such embodiments, stator segment retainers 107 can be implemented as grooves and/or channels forming the female portion F. For example, mount plate 103 may include a series of dovetail channels having a complementary shape to a shape of material present on back iron 120 of stator segment laminate 110. One of ordinary skill in the art will recognize that such an implementation is intended to fall within the scope of the present disclosure.

In some embodiments, an axis of symmetry associated with retainer interface 125 may be substantially co-linear with axis of symmetry S associated with stator segment 105. For example, retainer interface 125 may be aligned so as to maintain substantial symmetry of stator segment laminate 110. One of ordinary skill in the art will recognize that retainer interface 125 may be located in any desired location associated with stator segment laminate 110, particularly on back iron 120.

Figure 2E:
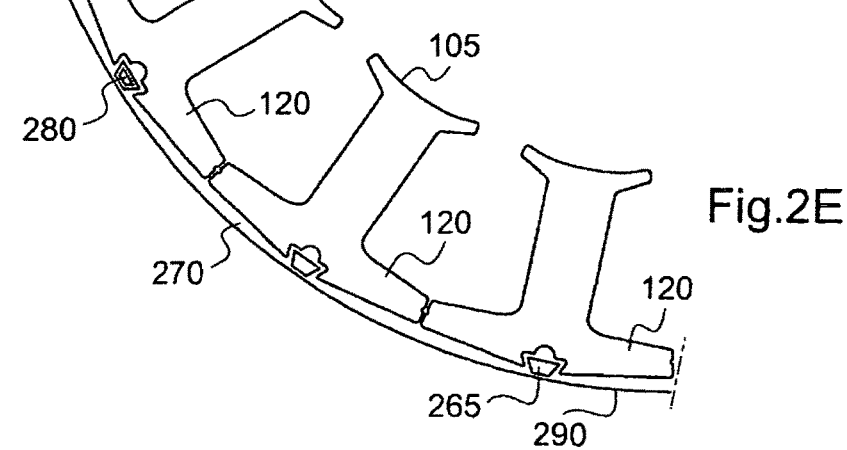
FIG. 2E is a planar sectional illustration of an exemplary gap implemented utilizing retainer interfaces following assembly of a stator core, consistent with embodiments of the present disclosure.

Retainer interfaces 125 may serve additional purposes during operation of an assembled stator. FIG. 2E is a planar sectional illustration of an exemplary gap 270 implemented utilizing retainer interfaces 125 following assembly of stator core 202, consistent with embodiments of the present disclosure. End caps 300 and windings are not shown in FIG. 2E for purposes of clarity. As shown, spacers 265 may comprise dovetail lengths of material, similar to stator segment retainers 107, and may be inserted into retainer interfaces 125 prior to installation of stator casing 290 for purposes of forming a gap or channel 270 between stator casing 290 and back irons 120. It may then be possible to cause a fluid (e.g., air) to flow between stator casing 290 and back irons 120 during operation of the stator for various purposes, such as, for example, cooling. Additionally, spacers 280 may be made hollow incorporating a cooling passage 280 such that a fluid (e.g., air) may be passed through the hollow lengths of material, resulting in enhanced cooling of the stator. One of ordinary skill in the art will recognize that numerous configurations may be implemented with regard to retainer interfaces 125 for various purposes, such as, cooling, eddy current control, etc. All such implementations are intended to fall within the scope of the present disclosure.

In some embodiments, each front and back face of back iron 120 may further include one or more end cap aperture interfaces 130. End cap aperture interface 130 may be configured to interface with a stator segment end cap 300 (not shown in FIG. 2B) to facilitate holding of end cap 300 in place, e.g., during a winding process, among other things. As shown in FIG. 2B, end cap aperture interface 130 may comprise an aperture or hole of a desired shape and size placed in a desired location on stator segment laminate 110, particularly back iron 120. For example, end cap aperture interface 130 may be a circular, semi-circular, square, trapezoidal, triangular, or any other desired shape void or protrusion. In some embodiments, end cap aperture interface 130 may comprise a semi-circular void positioned in association with retainer interface 125. In such an example, an axis of symmetry associated with end cap aperture interface 130 may be substantially co-linear with axis of symmetry S associated with stator segment laminate 110 (and therefore stator segment 105) and/or an axis of symmetry associated retainer interface 107. Alternatively, end cap interface 130 may be positioned independently of retainer interface 125, as desired.

In some embodiments, a predetermined number of stator segment laminates 110 associated with a stator segment 105 may include end cap aperture interface 130, for example, where end cap interface comprises a hole. In such an embodiment, stator segment laminates 110 including end cap aperture interface 130 may be positioned at a first end of stator segment 105 and at a second end of stator segment 105. For example, X number of stator segment laminates 110 including an end cap aperture interface 130 configured as a void may be placed on stator segment retainer 107, followed by a predetermined number of stator segment laminates 110 not including end cap aperture interface 130, followed by another X number of laminates including end cap aperture interface 130. Thus, the result may be a blind hole or aperture on each face of back iron 120. Alternatively, where all stator segment laminates 110 include an end cap aperture interface 130 having a void, a through hole or aperture may result in back iron 120.

Although not shown, in some embodiments, end cap aperture interface 130 may alternatively comprise a protrusion extending from back iron 120. For example, stator segment laminates 110 may comprise an aperture, which, when stator segment laminates 110 are assembled, forms a hole extending through the length of stator segment 105. A rod or other device may be inserted through this hole, for example, to introduce additional forces on stator segment laminates 110, and also extending beyond the length of stator segment 105. Such extension may result in a protrusion on a face of stator segment 105, which may be caused to interface with an aperture on end cap 300 for example. One of ordinary skill in the art will recognize that other similar configurations may be implemented, for example, injection molding of plastic through the hole in stator segment 105, resulting in protrusions on faces of stator segment 105.

While the discussion herein is directed to the presence of a single end cap aperture interface 130, more than one end cap aperture interface 130 may be present at various locations on a face of stator segment 105. Each of such end cap aperture interfaces 130 may vary in size and shape, and may be configured for interfacing a corresponding tooth engaging segment 325 on end cap 300.

Figure 3A:
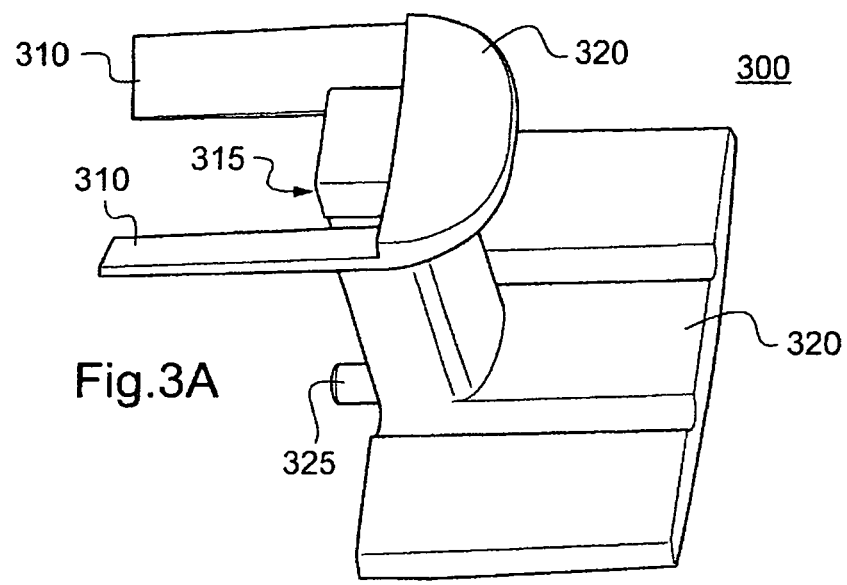
FIG. 3A is an exemplary end cap consistent with embodiments of the present disclosure.

FIG. 3A is an exemplary end cap 300 consistent with embodiments of the present disclosure. End cap 300 is configured for insulating end portions of stator segments 105, supporting windings about stator segments 105 (windings not shown), and applying forces associated with the windings for maintaining stator segment laminates 110 in place, among other things. End cap 300 comprises any suitable insulating material, for example, a plastic (e.g., injection molded plastic), a ceramic, and/or a composite, and may be of any desired shape, particularly in view of a geometry associated with stator segments 105.

End cap 300 may include a tooth engaging segment 325, insulation engaging segments 310, end cap face 315, and winding stops 320, among other things (e.g., wire guides). End cap face 315 may present tooth engaging segment 325, and may therefore be configured to bear upon a face of stator segment 105. End cap face 315 may be substantially flat and/or matching contours associated with the face of stator segment 105 on which it is to bear. Winding stops 320 may be configured to provide support for windings (not shown) on stator segment 105, particularly where such winding may have a tendency to slip or otherwise dislodge from an initially wound position.

Tooth engaging segment 325 is configured to engage end cap aperture interface 130 present on back iron 120 and/or stator segment 105. Therefore, tooth engaging segment 325 may comprise a protrusion or other suitable feature (e.g., hole/aperture) facilitating engagement with end cap aperture interface 130. For example, where a semi-circular end cap aperture interface 130 having a radius R has been provided on a first face of stator segment 105, a semi-circular protrusion having a radius approximately equal to or slightly smaller than R can be provided as tooth engaging segment 325 on end-cap 300. Such a protrusion may be molded or otherwise fabricated on end cap 300, or in some embodiments, may be fastened to end cap 300.

While the discussion herein is directed to the presence of a single tooth engaging segment 325, more than one tooth engaging segment 325 may be present on end cap 300. Each of such tooth engaging segments 325 may vary in size and shape, and may be configured for interfacing a corresponding end cap interface on back iron 120 and/or stator segment 105. For example, there may be 2, 3, 4, or more tooth engaging segments present on end cap 300, as desired.

Insulation engaging segments 310 are configured to interface with and retain insulating material 510 (shown in FIG. 5) inserted between stator segments 105 and stator windings (not shown). Insulation engaging segments 310 therefore comprise one or more protrusions, tabs, extensions, or other suitable configurations molded with or otherwise affixed to end cap 300. Insulation engaging segments 310 are aligned such that at least a portion of insulation engaging segments 310 extends along a length of stator segment 105 upon engagement of tooth engaging segment 325 and end cap aperture interface 130. For example, insulation engaging segments 310 may be sloped such that, upon installation of end cap 300 on stator segment 105, insulation engaging segments 310 project substantially parallel to pole shoes 150 (when present) and exert a force against pole shoes 150 (e.g., perpendicular to a surface of pole shoes 150). In another example, insulation engaging segments 310 may be configured to run parallel to tooth 115 exerting a force against tooth 115 (e.g., perpendicular to a surface of tooth 115) such that any inserted insulating material 510 may be retained.

Figure 3B:
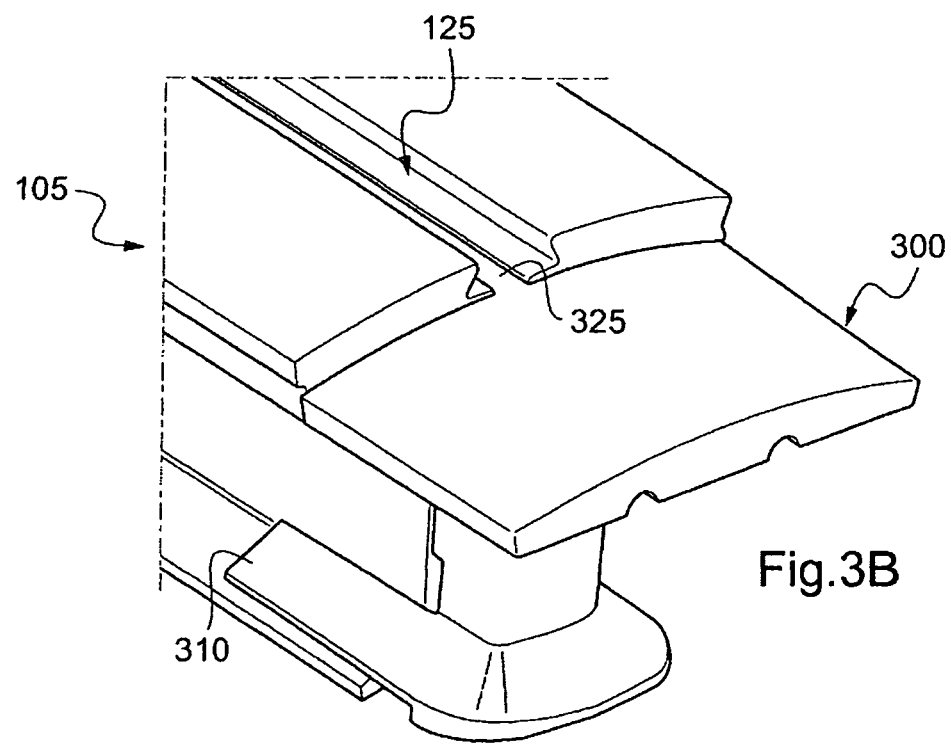
FIG. 3B is an exemplary representation of an end-cap installed on a stator segment, consistent with embodiments of the present disclosure.

FIG. 3B is an exemplary representation of an end-cap installed on an end portion of stator segment 105. As can be seen in FIG. 3B, tooth engaging segment 325 may be engaged within end cap aperture interface 130, and insulation engaging segments 310 may be configured to contact or otherwise exert forces on insulating material 510 located between insulation engaging segments 310 and, for example, pole shoes 150 and/or tooth 115. For example, one or more layers of insulating material 510 (e.g., electrically non-conductive materials such as papers, plastics, composites, etc.) may be placed in contact with stator segment 105 between stator pole shoe 150 (when present) and/or tooth 115, and back iron 120. Following placement of such insulating material 510 (not shown in FIG. 3B), end cap 300 may be positioned such that insulation engaging segments 310 slide over and press against insulating material 510, thereby resulting in substantial retention of insulating material 510 in a predetermined location.

Figure 3C:
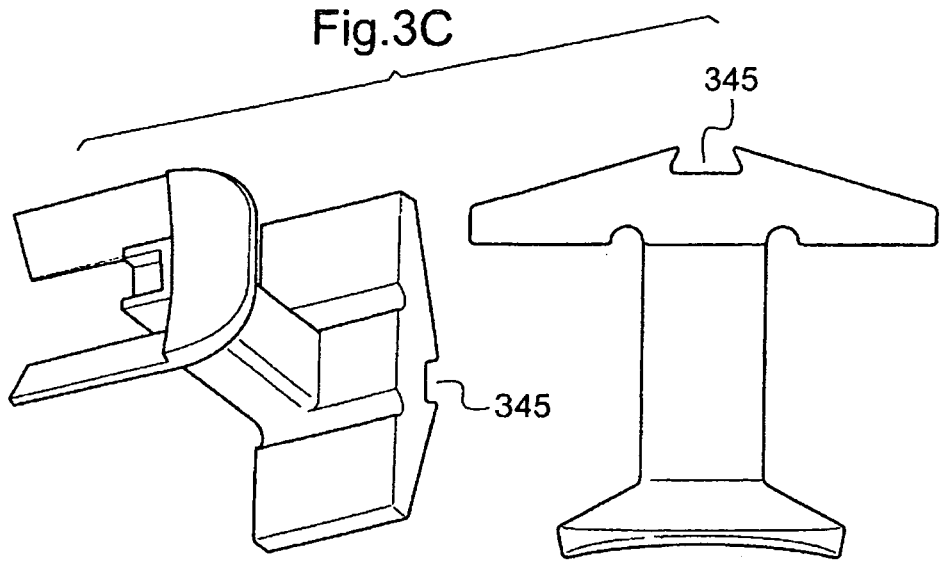
FIG. 3C is an illustration of an alternative end cap in elevation and three-dimensional view, consistent with embodiments of the present disclosure.

FIG. 3C is an illustration of an alternative end cap 300 in elevation and three-dimensional view, consistent with embodiments of the present disclosure. In such embodiments, end cap 300 may include an end cap dovetail interface 345 similar to retainer interface 125 provided on stator segment laminates 110, i.e., a dovetail shaped channel, groove, or hole configured to interface with stator segment retainers 107. End cap dovetail interface 345 may be present in conjunction with, or in lieu of, tooth engaging segment 325. Therefore, end cap dovetail interface 345 may be configured to interface with stator segment retainers 107, thereby allowing installation of end-cap 300 in a similar manner to assembly of stator segment laminates 110 (e.g., align and press in place).

Notably, it may be desirable in some embodiments to injection mold end caps 300 in contact with stator segments 105. For example, stator segments 105 mounted on mounting jig 100 may be inserted into a mold configured to receive such a device. Subsequently, insulating material 510 and end caps 300 may be injection molded using a thermoplastic or other suitable material to effectively encase portions of stator segments 105 thereby forming end caps 300.

Figure 4:
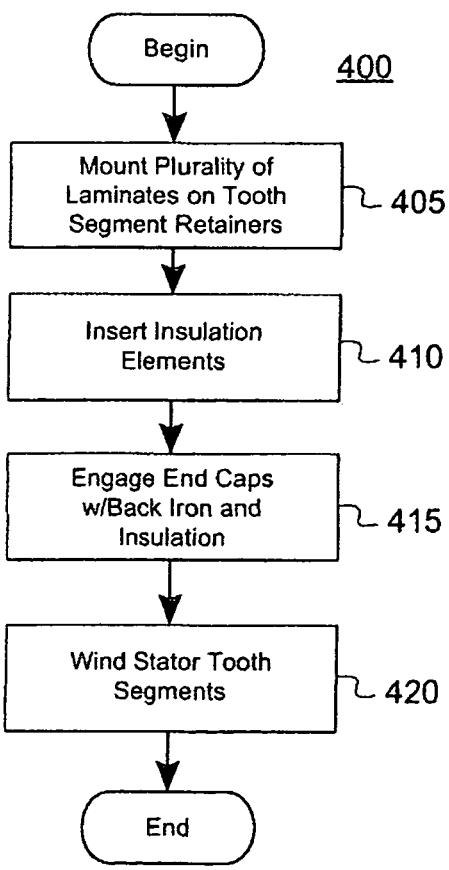
FIG. 4 is a flowchart of an exemplary method for preparation of winding stator teeth, consistent with embodiments of the present disclosure.

Systems and methods of the present disclosure may enable the manufacture of an electric device stator, facilitating increases in manufacturing efficiencies and reduction in assembly time and waste, among other things. FIG. 4 is a flowchart 400 of an exemplary method for preparation of winding stator teeth consistent with embodiments of the present disclosure. For purposes of clarity, FIGS. 5 and 6 will also be referenced during the following discussion. Upon obtaining a desired number of stator segment laminates 110 and a mount plate 103 with stator segment retainers 107 suitably mounted thereon (e.g., clipped), stator segment laminates 110 may be loaded onto stator segment retainers 107 via retainer interfaces 125 (step 405). For example, stator segment laminates 110 may be aligned with stator segment retainers 107 such that a pressing motion may be used to cause engagement of retainer interfaces 125 with stator segment retainers 107 along width W of mount plate 103. If desired, such assembly of a stator segment laminate 110 onto a segment retainer 107 may result in an interference fit between stator segment laminate 110 and at least one of winding jig 100 and stator segment retainer 107.

In some embodiments, stator segment laminates 110 may be placed one by one, or grouped in any desired combination. Further, it may be possible to assemble stator segment laminates 110 onto stator segment retainer 107 prior to affixing to mount plate 103, where desired. Additional stator segment laminates 110 may be assembled along stator segment retainer 107 until a desired tooth size has been attained. A number of stator segment laminates 110 used for assembly of stator segment 105 may be based on the thickness of the laminates for example. This operation may be repeated as desired to prepare a desired number of stator teeth for winding upon winding jig 100.

Notably, loose stator segment laminates 110 may be supplied as a loosely corresponding stack at any specified length with temporary holding materials to maintain correspondence between stator segment laminates 110 within the stack (e.g., tape, elastic, tie wraps, etc). Such a process may even be used during prototyping, thus enabling manufacture via lamination-punch tooling or, if desired, lasercut laminations. Such an arrangement may further facilitate loading onto stator segment retainers 107, with the temporary holding materials removed prior to winding.

In some embodiments, following placement of a desired number of stator segment laminates 110 on stator segment retainers 107, mount plate 103 may be engaged with a machine configured to introduce force to force receiver portion 134 for purposes of applying a force to retain stator segments 105 via retainer interfaces 125 (step 407). For example, mount plate 103 may be engaged on a pneumatic machine configured to generate a pulling force on force receiver section, thereby resulting in a force operating on stator laminates 110 through retainer interfaces 125.

Insulating material 510 may then be placed in desired locations associated with stator segments 105 (step 410). For example, FIG. 5 shows an exemplary configuration for insulating material 510, wherein insulating material 510 comprises, for example, a paper sheet that has been pre-folded to a desired shape, thereby facilitating insertion of insulating material 510 into spaces between stator segments 105 (e.g., between pole shoes 150 and back irons 120). Step 410 may be repeated as desired for purposes of placing a suitable amount of insulating material (e.g., between each stator segment 105 to be wound).

Following installation of insulating material 510, end caps 300 may be aligned and installed on stator segments 105 and/or stator segment retainers 107 (step 415). For example, end caps 300 may be aligned such that a sliding motion may cause engagement of end cap dovetail interface 345 and stator segment retainers 107, and/or tooth engaging segment 325 and end cap aperture interfaces 130. In some embodiments, interference fitting may occur between portions of end caps 300 (e.g., end cap dovetail interface 345) and respective surfaces of stator segment 105 and/or jig 100. FIG. 6 is an exemplary illustration of end cap 300 installation, showing end cap dovetail interface 345 engaged with stator segment retainers 107 and insulation engaging segments 310 engaged with insulating material 510.

With end caps 300 installed, winding jig 100 may be affixed to a winding machine and/or otherwise transported/placed in preparation for winding (e.g., an open slot needle winding process) (step 420).

Winding, as used herein, should mean any process whereby electrical coils are installed on a stator segment 105. For example, winding may take place using a machine rotating about an axis and dispensing wire around the surface of stator segment 105. Alternatively, for example where pole shoes 150 are absent, prefabricated coils or "windings" (i.e., wire already prepared as a desired number of loops) may be inserted on tooth 115 and secured in place via any suitable method (e.g., adhesive, interference fit, etc.)

Once stator segments 105 have been assembled and wound, the individual teeth may be removed from winding jig 100 (e.g., force released and stator segments 105 removed from stator segment retainers 107) and assembled into a complete stator core. For example, each stator segment 105 may be joined to another stator segment 105 via interconnecting segments 114 and 116. Following assembly into a stator core, and where desired, spacers 265 may be inserted into retainer interfaces 125, and stator casing 290 may be installed.

Throughout the present disclosure the term "at least one" is intended to include one and/or "a" single implementation of the referenced object or action. Further, it will be apparent to those skilled in the art that various modifications and variations can be made to the disclosed electric device stator and methods for manufacture. Other embodiments will be apparent to those skilled in the art from consideration of the specification and practice of the disclosed systems and methods. It is intended that the specification and examples be considered as exemplary only, with a true scope being indicated by the following claims and their equivalents.)

What is claimed is:

1. A stator core comprising a plurality of stator segments assembled together, each stator segment comprising:
    only one tooth section;
    a back iron section, the back iron section comprising a retainer interface, the retainer interface being a cut-out having a dovetail shape; and
    an end cap, the end cap further comprising insulator engaging segments;
    wherein only one insulating element is inserted into respective spaces between adjacent stator segments, the insulator engaging segments retaining the insulating elements in the corresponding space and, the insulating elements being loose fit in the respective spaces.

2. The stator core of claim 1, wherein the end cap comprises an end cap dovetail interface, the end cap dovetail interface being at least partially dovetail in shape.

3. The stator core of claim 2, wherein a periphery of the end cap dovetail interface is configured to substantially coincide with a periphery of the retainer interface.

4. The stator core of claim 2, wherein an axis of symmetry associated with the end cap aperture interface or the end cap dovetail interface is substantially co-linear with an axis of symmetry associated with the stator segment.

5. The stator core of claim 1, wherein an axis of symmetry associated with the retainer interface is substantially co-linear with an axis of substantial symmetry associated with the stator segment.

6. The stator core of claim 1, wherein the stator segment further comprises a plurality of stator segment laminates comprising a magnetic material.

7. The stator core of claim 1, wherein the retainer interface is located at a peripheral surface of the back iron.

8. The stator core of claim 1, wherein the end cap comprises an electrically non-conductive material.

9. The stator core of claim 1, wherein the end cap comprises an injection molded plastic material.

10. The stator core of claim 1,
    each stator segment comprising pole shoes;
    the end cap comprising a winding stop, the winding stop comprising portions facing respectively the pole shoes and the back iron section, the insulator engaging segments comprising tabs of elongate shape extending along a length of the stator segment, said tabs of elongate shape extending only from the portion of the winding stop facing the pole shoes.

11. The stator core of claim 1, each stator segment further comprising an aperture on a face of the stator segment forming an end cap aperture interface; and
    wherein the end cap comprises a tooth engaging segment configured for engaging the end cap aperture interface.

12. The stator core of claim 11, the end cap aperture interface and the tooth engaging segment being semi-circular.

13. The stator core of claim 11, the tooth engaging segment having a radius sufficient to result in an interference fit when inserted into the end cap aperture interface.

14. A method for winding a stator segment comprising:
    retaining one or more of the stator segments of claim 1 via the retainer interfaces;
    positioning one or more insulators relative to the stator segment;
    retaining the end cap in relation to one of the one or more stator segments so as to retain the one or more insulators; and
    winding one or more coils of wire around the tooth section of each of the one or more stator segments.

* * * * *